United States Patent
Lim et al.

(10) Patent No.: US 7,779,287 B2
(45) Date of Patent: Aug. 17, 2010

(54) REDUCING POWER CONSUMPTION IN MULTIPROCESSOR SYSTEMS

(75) Inventors: Soon Chieh Lim, Gelugor (MY); Loo Shing Tan, Butterworth (MY); Ying Wei Liew, Air Itam (MY)

(73) Assignee: Intel Corporation, Santa Clara, CA (US)

( * ) Notice: Subject to any disclaimer, the term of this patent is extended or adjusted under 35 U.S.C. 154(b) by 1322 days.

(21) Appl. No.: 11/208,778

(22) Filed: Aug. 22, 2005

(65) Prior Publication Data
US 2007/0043964 A1 Feb. 22, 2007

(51) Int. Cl.
*G06F 1/04* (2006.01)
(52) U.S. Cl. .................................. 713/500; 713/322
(58) Field of Classification Search ................ 713/300, 713/322, 500
See application file for complete search history.

(56) References Cited

U.S. PATENT DOCUMENTS

| 5,394,443 | A | * | 2/1995 | Byers et al. | 375/371 |
| 5,774,704 | A | * | 6/1998 | Williams | 713/501 |
| 6,393,374 | B1 | * | 5/2002 | Rankin et al. | 702/132 |
| 6,724,759 | B1 | * | 4/2004 | Chang et al. | 370/389 |
| 6,973,078 | B2 | * | 12/2005 | Ma | 370/359 |
| 7,051,133 | B2 | * | 5/2006 | Takata | 710/111 |
| 7,082,547 | B2 | * | 7/2006 | Inohara | 713/600 |
| 2002/0169990 | A1 | | 11/2002 | Sherburne, Jr. | |

* cited by examiner

*Primary Examiner*—Thomas Lee
*Assistant Examiner*—Eric Chang
(74) *Attorney, Agent, or Firm*—Caven & Aghevli LLC

(57) ABSTRACT

Techniques that may be utilized in a multiprocessor system to reduce power consumption are described. In one embodiment, one or more internal components of a processor core are clocked at least partially by a frequency controlled clock signal.

21 Claims, 7 Drawing Sheets

REDUCING POWER CONSUMPTION IN MULTIPROCESSOR SYSTEMS

BACKGROUND

As integrated circuit fabrication technology improves, manufacturers are able to integrate additional functionality on a single chip. The additional functionality, however, also adds to the number of components on a single chip, which results in additional signal switching, in turn, consuming more power and generating more heat. Excessive heat may damage a chip by, for example, thermal expansion. Also, the additional heat and power consumption may limit where a computer system may be installed.

Computing performance may be improved by incorporating multiple processor cores on a single chip. The number of processor cores that may be successfully incorporated on a single chip, however, may be limited due to the excessive heat generation and/or power consumption.

Fans may be utilized to dissipate heat generated by chips, for example, in conjunction with heat sinks. Heat sinks are pieces of metallic material that draw the generated heat away from a chip. Fans may then direct the extracted heat away from computer systems. As the generated heat increases, however, so does the cost associated with providing an adequate heat sink.

Another approach uses liquid cooling which can be expensive and is generally reserved for higher end computer systems (such as super computers).

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention.

Figure 1:
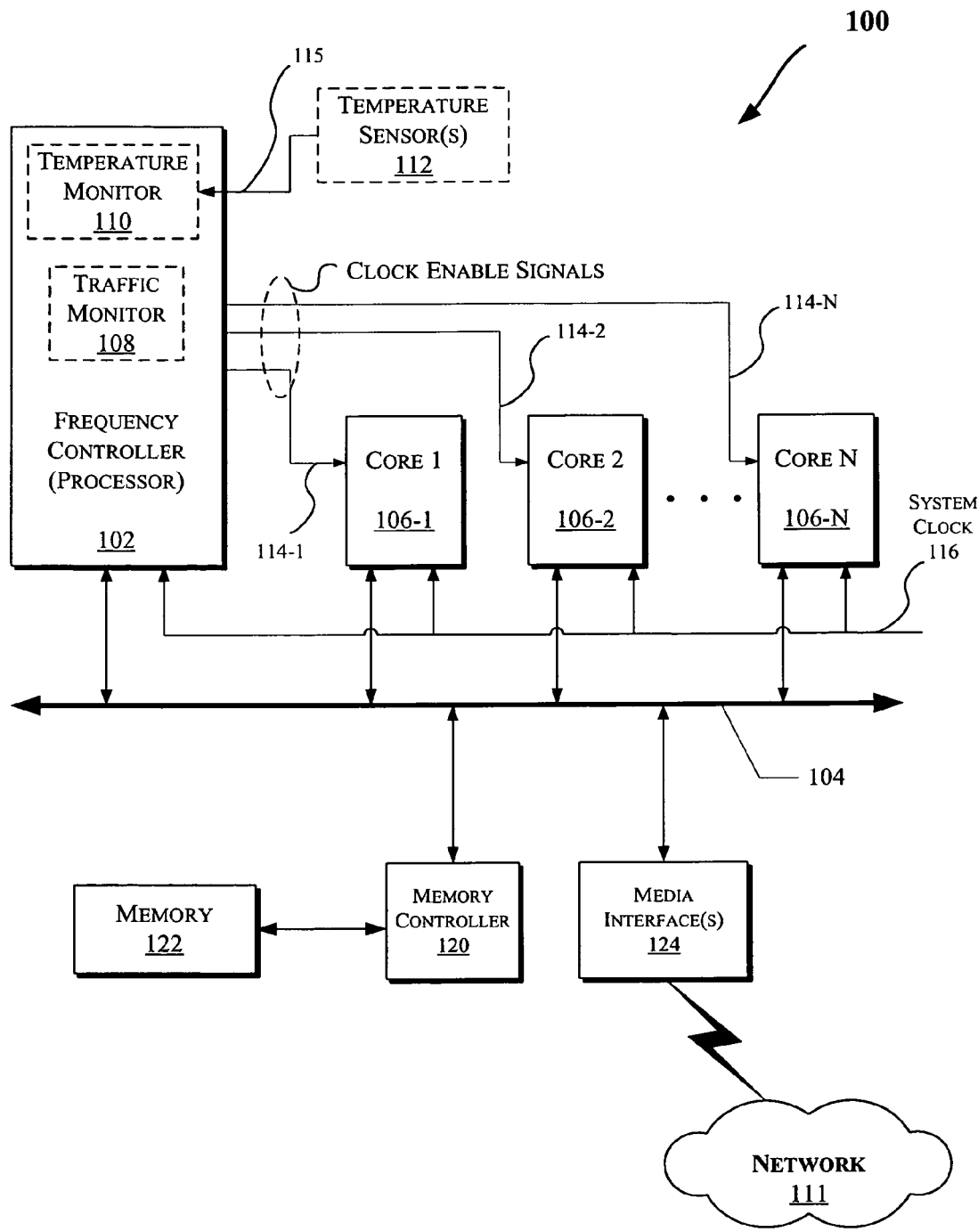
FIG. 1 illustrates a block diagram of portions of a multiprocessor system, in accordance with an embodiment of the invention.

Techniques discussed herein with respect to various embodiments may reduce power consumption in multiprocessor systems, such as the system shown in FIG. 1. More particularly, FIG. 1 illustrates a block diagram of portions of a multiprocessor system 100, in accordance with an embodiment of the invention. The system 100 includes a frequency controller 102 (which may be a processor in an embodiment). The frequency controller 102 may be coupled through a bus (or interconnection network) 104 to one or more processor cores (106-1 through 106-N).

Any suitable processor such as those discussed with reference to FIGS. 6 and/or 7 may comprise the processor cores (106) and/or the frequency controller processor 102. Also, the processor cores 106 and/or the frequency controller processor 102 may be provided on the same integrated circuit die. One of the processor cores 106 may be configured as the frequency controller 102. In one embodiment, the system 100 may process data communicated through a computer network (111). In an embodiment, the processor cores (106) may be, for example, one or more microengines (MEs). Additionally, the frequency controller processor 102 may be a core processor (e.g., to perform various general tasks within the system 100).

The frequency controller 102 may include a traffic monitor 108 and/or a temperature monitor 110. The traffic monitor 108 may include software and/or hardware that monitor data and/or status of data communicated through a computer network (111). For example, the traffic monitor 108 may determine the existence of network traffic congestion, quality of service criterion, and/or data priority, as will be further discussed herein, e.g., with reference to FIGS. 2-4. The temperature monitor 110 may include software and/or hardware that monitor temperature data (e.g., from one or more temperature sensors 112). In an embodiment, one or more temperature sensors (112) may be placed proximate to components of the system 100. For example, one or more temperature sensors (112) may be placed proximate to the processor cores (106).

Also, the traffic monitor 108 and/or temperature monitor 110 may be provided in any suitable location, e.g., other than inside the frequency controller 102. For instance, the traffic monitor 108 and/or temperature monitor 110 may be provided within the processor cores (106), e.g., the temperature sensors (112) may be directly coupled to the processor cores (106).

The frequency controller 102 may generate one or more clock enable signals (e.g., 114-1 through 114-N) responsive to one or more feedback signals. The feedback signals may be generated internal to the frequency controller 102 or external to the frequency controller 102, e.g., by various components of the system 100. For example, the feedback signals may be the signal (115) generated by the temperature monitor 110 and/or a signal generated by the traffic monitor 108. Additionally, the clock enable signals (114) may be communicated through the bus 104, instead of directly to the processor cores (106). The embodiment illustrated in FIG. 1 which couples the clock enable signals (114) to the processor cores (106) may reduce propagation delays associated with communicating data via the bus 104 in an embodiment. Moreover, as will be further discussed with reference to FIG. 2, the clock enable signals (114) may be utilized by the processor cores (106) to reduce their respective power consumption. Each of the processor cores (106) and/or the frequency controller 102 may also receive a system clock signal 116.

As shown in FIG. 1, the system 100 may further include a memory controller 120 that is coupled to the bus 104. The memory controller 120 may be coupled to a memory 122 which may be shared by the frequency controller 102, the processor cores (106), and/or other devices coupled to the bus 104. The memory 122 may store data and/or sequences of instructions that are executed by the frequency controller processor 102 and/or the processor cores (106), or other device included in the system 100. Also, the memory 122 may store data corresponding to one or more data packets communicated over a network (111) that is coupled to one or more media interfaces 124. Also, the system 100 may be coupled to a network through various communication devices (such as the devices discussed with reference to FIGS. 6 and 7). As shown in FIG. 1, the media interfaces 124 may communicate with various components of the system 100 through the bus 104. Alternatively, one or more of the media interfaces 124 may be directly coupled to one or more components of the system 100, such as the frequency controller processor 102 and/or one or more of the processor cores (106).

In an embodiment, the memory 122 may include one or more volatile storage (or memory) devices such as those discussed with reference to FIG. 6. Moreover, the memory 122 may include nonvolatile memory (in addition to or instead of volatile memory) such as those discussed with reference to FIG. 6. Hence, the system 100 may include volatile and/or nonvolatile memory (or storage). Additionally, multiple storage devices (including volatile and/or nonvolatile memory) may be coupled to the bus 104 (not shown).

Figure 2:
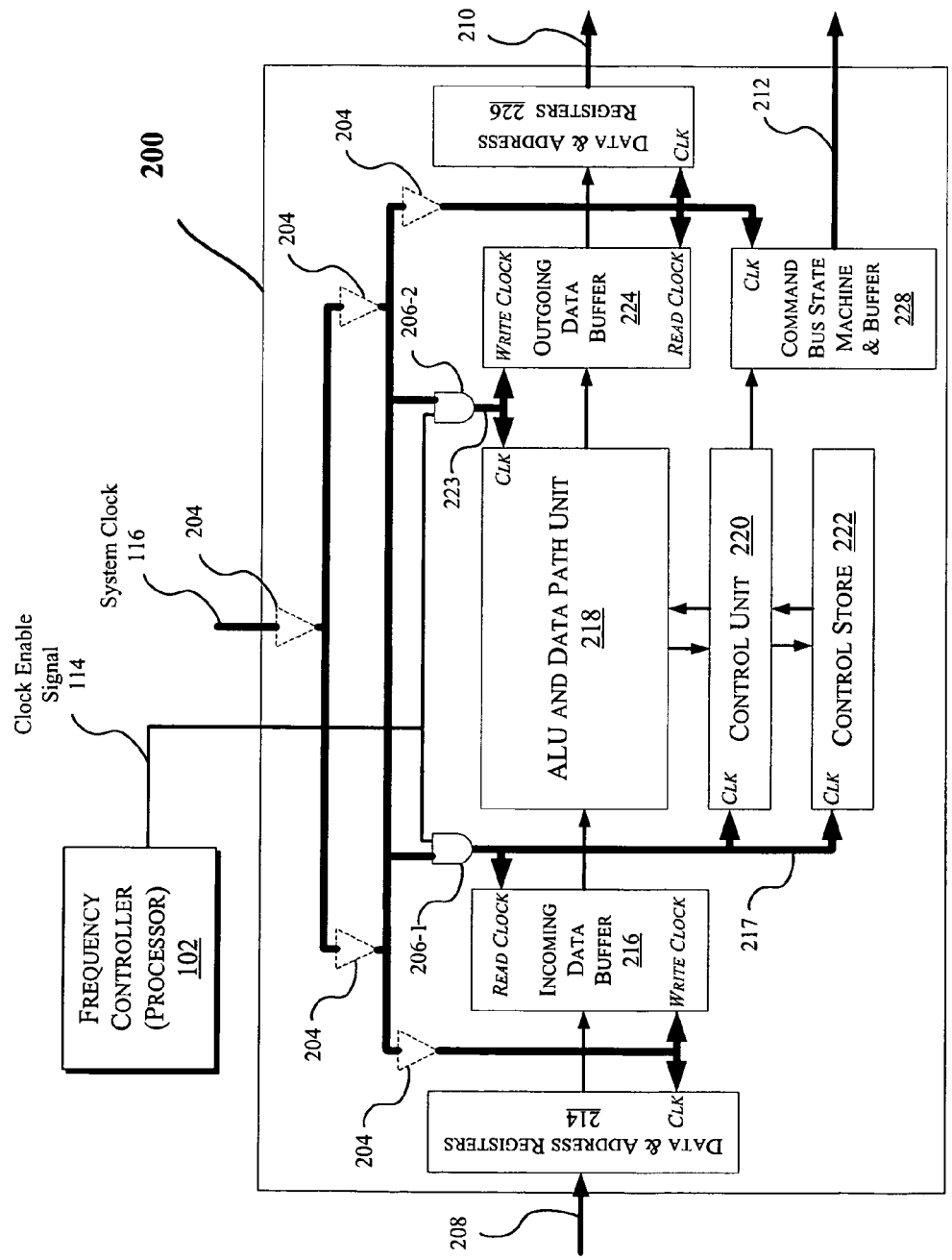
FIG. 2 illustrates a block diagram of a processor, according to an embodiment.

FIG. 2 illustrates a block diagram of a processor 200, according to an embodiment. The processor 200 may be any suitable processor such as the processor cores (106) discussed with reference to FIG. 1. In one embodiment, the clock enable signal (114) may be utilized by the processor 200 to reduce its power consumption.

As illustrated in FIG. 2, the processor 200 may utilize the system clock signal 116 to clock various components of the processor 200 through one or more optional buffers 204. The clock 116 may be combined with the clock enable signal 114 to control the clock frequency utilized for some components of the processor 200. For example, one or more AND gates (206-1 and/or 206-2) may be utilized to combine the clock 116 with the clock enable signal 114, as will be further discussed with respect to FIGS. 3A and 3B.

In an embodiment, the system clock signal 116 may be running at system-wide speed to enable communication and/or synchronization with other components, such as other components of the system 100 of FIG. 1 (e.g., through the bus 104 of FIG. 1). Hence, the clock 116 may be shared by various components of the system 100 such as illustrated in FIG. 1. In one embodiment, the bus 104 of FIG. 1 may comprise a read bus 208, a write bus 210, and/or a command bus 212. As push data (or read data) is received from the read bus 208, the processor 200 stores the push data in data and address registers 214 that are clocked by the clock 116. The read data may be provided by various components of the system 100 such as the frequency controller 102, memory 122, or the like. The read data is written to an incoming data buffer 216 that is also clocked by the clock 116 when reading data. The incoming data buffer 216 may be any suitable data buffer such as a first-in, first-out (FIFO) buffer. In an embodiment, to reduce data loss, the component that is sending the data destined for the processor core 200 (e.g., the frequency controller 102, memory 122, or the like) may determine whether the incoming data buffer 216 has sufficient available space to store the push data prior to sending the data to the processor 200 on the read bus 208.

The data stored in the incoming data buffer 216 may be read into an arithmetic logic unit (ALU) and data path unit 218 by utilizing a frequency controlled clock signal 217. The ALU and data path unit 218 may execute various instructions within the processor core 200, e.g., by processing the data stored in the incoming data buffer 216. The frequency controlled clock signal 217 may be generated by combining the system clock signal 116 and the clock enable signal 114 (e.g., through the AND gate 206-1). The ALU and data path unit 218 may be coupled to a control unit 220 that controls the operations of the ALU and data path unit 218. As illustrated in FIG. 2, the control unit may be clocked by the frequency controlled clock signal 217. The control unit 220 may be coupled to a control store 222 to provide local storage for the control unit 220.

As shown in FIG. 2, the control store 222 may also be clocked by the frequency controlled clock signal 217. For example, the frequency controller processor 102 (or other components of the system 100) may load the control store 222 with various software procedures (which include one or more instructions). The control unit 220 may utilize the information stored in the control store 222 for managing the operations of the ALU and data path unit 218. In one embodiment, one or more software procedures may be loaded into the control store 222 at initialization of the system 100. The one or more software procedures may also be loaded into the control store 222 during the operation of the system 100, e.g., without a shutdown or setup sequencing cycle. Moreover, the control store 222 may be any suitable memory device such as those discussed with reference to FIG. 6. In an embodiment, the control store 222 is a static random access memory (SRAM).

As illustrated in FIG. 2, the ALU and data path unit 218 may be clocked by a frequency controlled clock signal 223 that is generated by combining the system clock signal 116 and the clock enable signal 114 (e.g., by the AND gate 206-2). Data may be read from the ALU and data path unit 218 and written to an outgoing data buffer 224 (e.g., by utilizing the clock 223). Data from the outgoing data buffer 224 may be read into data and address registers 226 which are clocked by the system clock signal 116. Data stored in the data and address registers 226 may be communicated to various components of the system 100 of FIG. 1 via the write bus 210. Additionally, the control unit 220 may be coupled to a command bus state machine and buffer 228 which is clocked by the system clock signal 116 (e.g., in part because the command bus state machine and buffer 228 may need to respond to the bus grant signals during the operations of the system 100 of FIG. 1). The control unit 220 may direct the command bus state machine and buffer 228 to communicate various commands to other components of the system 100 via the command bus 212. For example, the command bus state machine and buffer 228 may instruct the memory 122 of FIG. 1 to fetch data from the outgoing data buffer 224 via the data and address registers 226. Moreover, the buffers within various components of the processor 200 (e.g., 216, 224, or 228) may be configured as FIFO memory devices.

Figure 3A:
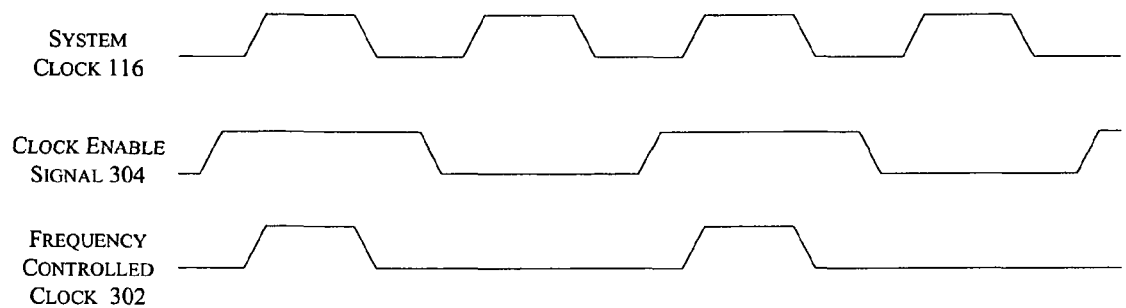
FIGS. 3A and 3B illustrate signal diagrams corresponding to sample system clock, clock enable, and frequency controlled clock signals, according to various embodiments.
Figure 3B:
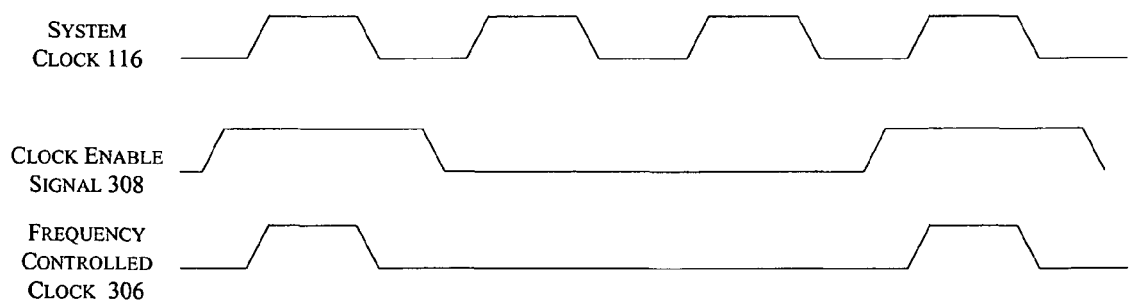

FIGS. 3A and 3B illustrate signal diagrams corresponding to sample system clock, clock enable, and frequency controlled clock signals, according to various embodiments. For example, FIG. 3A illustrates a frequency controlled clock signal 302 that is provided by combining the shown system clock signal 116 and clock enable signal 304. As can be seen, the frequency controlled clock signal 302 has a period that is ½ the period of the system clock signal 116. Similarly, FIG. 3B illustrates a frequency controlled clock signal 306 generated by combining the system clock signal 116 and clock enable signal 308. The frequency controlled clock signal 306 has a period that is ⅓ of the period of the system clock signal 116. In some embodiments, the frequency controlled clock signals 302 and 306 may be generated by combining the respective clock enable signals (304 and 308) such as discussed with reference to FIG. 2. For example, one or more AND gates (206) may be utilized to combine the system clock signal 116 with the respective clock enable signals (304 or 308). Hence, the clock enable signals 304 or 308 may be utilized as the clock enable signal 114 generated by the frequency controller 102.

Figure 4:
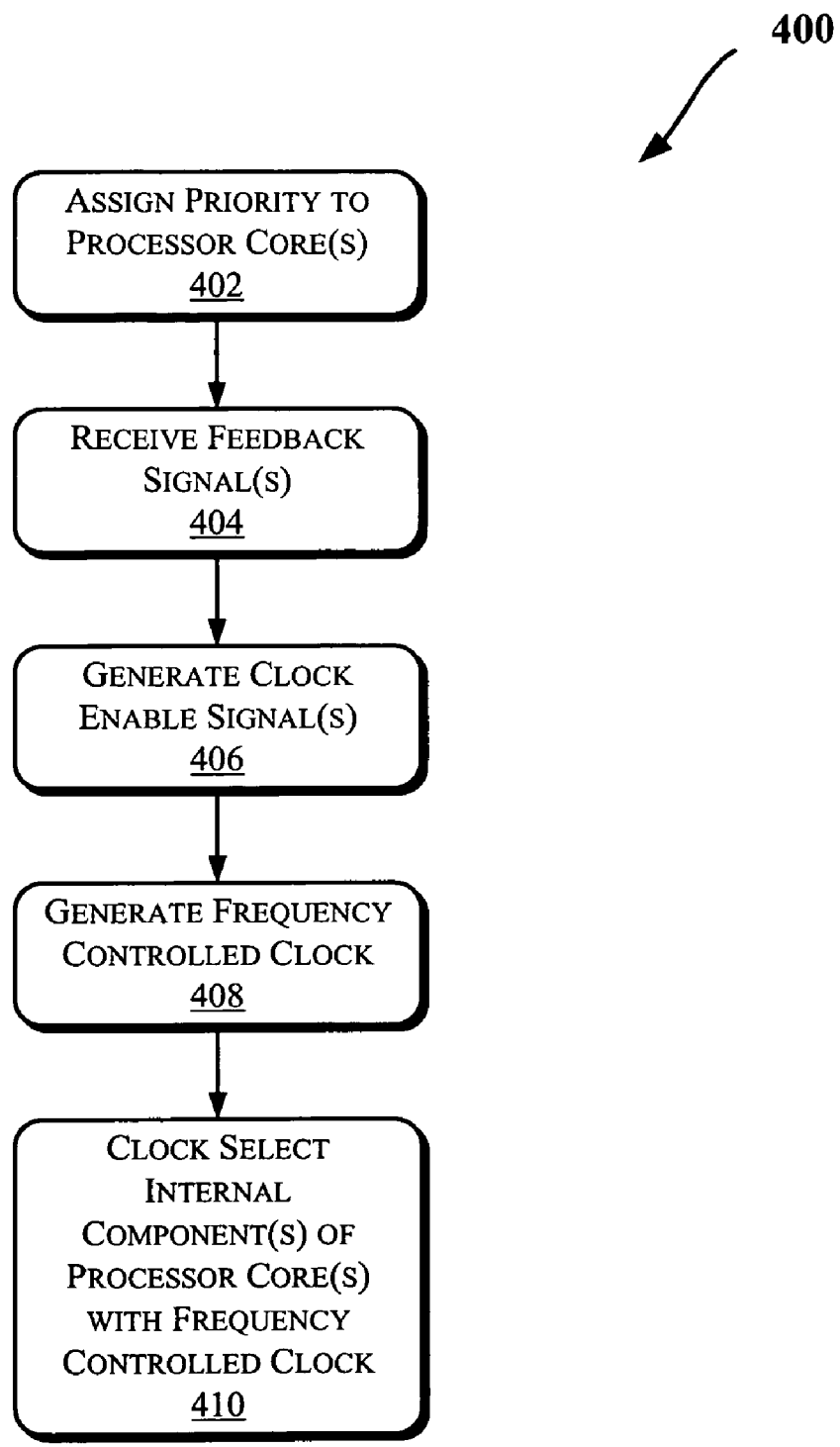
FIG. 4 illustrates a flow diagram of an embodiment of a method to control the clock frequency applied to select components of a processor core of a multiprocessor system.

FIG. 4 illustrates a flow diagram of an embodiment of a method 400 to control the clock frequency applied to select components of a processor core of a multiprocessor system. In one embodiment, the method 400 may be utilized to control the frequency of the clock applied to select components of the system 100 of FIG. 1, e.g., to reduce power consumption of the select components. Furthermore, the stages of the method 400 may be performed by one or more of the components of the system 100 of FIG. 1 and/or processor 200 of FIG. 2.

Referring to FIGS. 2 and 4, the frequency controller 102 may assign a priority to the processor cores 106 (402). The assigned priority may be based on the type of data a given processor core is handling. For example, a processor core that is processing real-time video streaming may be assigned a high priority. Moreover, a processor core that is processing low priority data (such as data packets) may be assigned a low priority. Additional levels of priority may be assigned depending on the implementation. The frequency controller 102 may further receive one or more feedback signals (404), such as discussed with reference to FIG. 1.

The frequency controller 102 may utilize the assigned priority information (402) and/or the feedback signals (404) to generate at least one clock enable signal 114 for each of the processor cores 106 (406). At a stage 408, logic that may be internal to the respective processor core 106 (such as the AND gates 206) may combine the clock enable signal 114 with the system clock signal 116 to generate a frequency controlled clock signal (e.g., 217 and/or 223). Depending on the implementation (e.g., such as defined by software executing on the frequency controller processor 102), the frequency controlled clock signal may have a lower frequency than the system clock signal.

At a stage 410, select internal components of the processor core may be clocked (at least partially) by the frequency controlled clock signal, e.g., to reduce power consumption of those select components of the processor core. In one embodiment, the internal components of the processor core that are clocked at least partially by the frequency controlled clock signal (e.g., 217 and/or 223) may include one or more of the incoming data buffer 216, ALU and data path unit 218, control unit 220, control store 222, or outgoing data buffer 224. As shown in FIG. 2, the processor core (200) may also include one or more peripheral components that are at least partially clocked by the system clock signal. For example, the peripheral components may include one or more of the data and address registers 214 and/or 226, incoming data buffer 216, outgoing data buffer 224, or command bus state machine and buffer 228. In an embodiment, the frequency controlled clock signal (e.g., 217 and/or 223) may be utilized to clock other components of the system 100 of FIG. 1.

Table 1 below shows sample values which may be utilized to control power consumption of the processor cores 106, e.g., by controlling the frequency of the frequency controlled clock signals 217 and/or 223.

TABLE 1

Sample Values for Power Consumption Control

| Performance | Thermal Threshold | | |
|---|---|---|---|
| | Low | Medium | High |
| High | 100% | 80% | 40% |
| Medium | 80% | 60% | 10% |
| Low | 60% | 40% | 0 |

In Table 1, the thermal threshold values may be determined based on threshold values configured in the temperature monitor 110 (which may be configurable via software in an embodiment). Similarly, the values that determine the various levels (e.g., high, medium, low, etc.) may be configured via software that may be executing on the frequency controller processor 102. The percentage numbers in Table 1 are sample values for the frequency of the frequency controlled clock signal (e.g., 217 and/or 223) relative to the system clock signal (116). In one embodiment, these percentage values may also be configurable via software, e.g., executing on the frequency controller processor 102.

As shown in Table 1, the frequency of the frequency controlled clock signal may be reduced when one of the feedback signals indicates a rise in temperature proximate to one or more of the processor cores, e.g., based on the priority assigned to a respective processor core (402). Conversely, the frequency of the frequency controlled clock signal may be increased when one of the feedback signals indicates a reduction in temperature proximate to one or more of the processor cores, e.g., based on the priority assigned to a respective processor core (402). For instance, a processor core which has a high performance priority (e.g., as determined by the stage 402) may receive a clock enable signal (114) that results in a frequency controlled clock signal (e.g., 217 and/or 223) with a frequency that is 40% of the system clock signal (116) when temperature sensor 112 indicates a high temperature; whereas, a processor core with a low priority may turn off its frequency controlled clock signal (e.g., 217 and/or 223) when the temperature is high. Accordingly, when the temperature becomes too hot, the frequency controller 102 may reduce the frequency of portions of the one or more processor cores (106), e.g., based on the assigned priority to the respective processor core (402). As discussed herein, the frequency reduction may also be based on one or more of traffic congestion, performance considerations (such as data priority), quality of service criterion, or the like.

In one embodiment, the frequency controller 102 may independently and/or dynamically control the frequency of each of the processor cores (106) to reduce power consumption, e.g., based on the implementation and/or the value of one or more of the feedback signals (e.g., that are generated by the temperature monitor 110 and/or the traffic monitor 108). In an embodiment, this approach may utilize a relatively smaller amount of die real estate (e.g., when compared with techniques that clock gate all portions of circuit).

Figure 5:
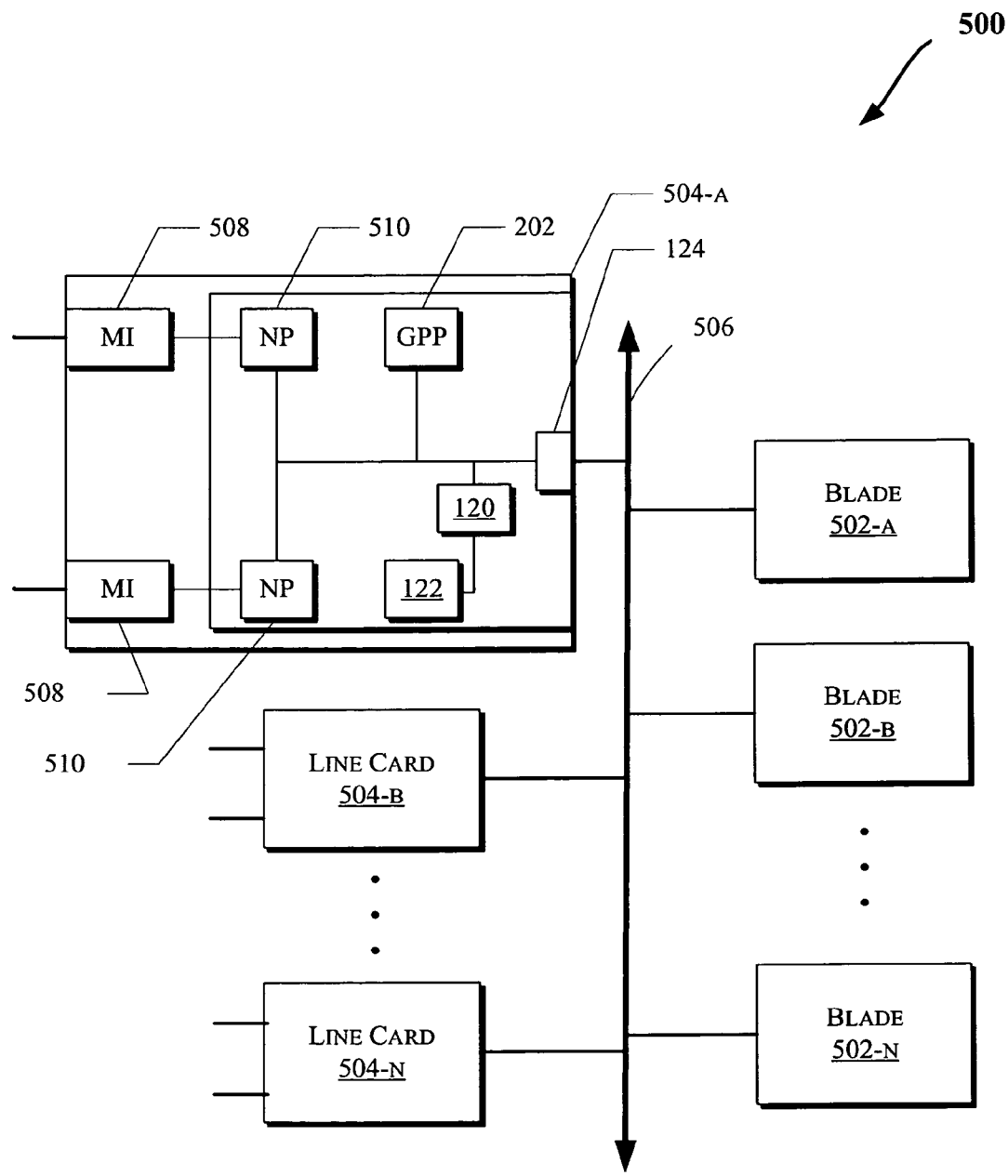
FIG. 5 illustrates an embodiment of a distributed processing platform.

The system 100 (of FIG. 1) and processor 200 of FIG. 2 may be used in a variety of applications. In networking applications, for example, it is possible to closely couple packet processing and general purpose processing for optimal, high-throughput communication between packet processing elements of a network processor (e.g., a processor that processes data communicated over a network, for example, in form of data packets) and the control and/or content processing elements. For example, as shown in FIG. 5, an embodiment of a distributed processing platform 500 may include a collection of blades 502-A through 502-N and line cards 504-A through 504-N interconnected by a backplane 506, e.g., a switch fabric. The switch fabric, for example, may conform to common switch interface (CSIX) or other fabric technologies such as advanced switching interconnect (ASI), HyperTransport, Infiniband, peripheral component interconnect (PCI), Ethernet, Packet-Over-SONET (synchronous optical network), RapidIO, and/or Universal Test and Operations PHY (physical) Interface for asynchronous transfer mode (ATM) (UTOPIA).

In one embodiment, the line cards (504) may provide line termination and input/output (I/O) processing. The line cards (504) may include processing in the data plane (packet processing) as well as control plane processing to handle the management of policies for execution in the data plane. The blades 502-A through 502-N may include: control blades to handle control plane functions not distributed to line cards; control blades to perform system management functions such as driver enumeration, route table management, global table management, network address translation, and messaging to a control blade; applications and service blades; and/or content processing blades. The switch fabric or fabrics (506) may also reside on one or more blades. In a network infrastructure, content processing may be used to handle intensive content-based processing outside the capabilities of the standard line card functionality including voice processing, encryption offload and intrusion-detection where performance demands are high.

At least one of the line cards 504, e.g., line card 504-A, is a specialized line card that is implemented based on the architecture of system 100, to tightly couple the processing intelligence of a processor to the more specialized capabilities of a network processor (e.g., a processor that processes data communicated over a network). The line card 504-A includes media interfaces 508 to handle communications over network connections. Each media interface 508 is connected to a processor, shown here as network processor (NP) 510 (which may be the frequency controller 102 in an embodiment). In this implementation, one NP is used as an ingress processor and the other NP is used as an egress processor, although a single NP may also be used. Other components and interconnections in system 500 are as shown in FIG. 1. Here the media interface(s) 124 of the system 100 may be coupled to the switch fabric 506. Alternatively, or in addition, other applications based on the multiprocessor system 100 could be employed by the distributed processing platform 500. For example, for optimized storage processing, such as applications involving an enterprise server, networked storage, offload and storage subsystems applications, the processor 510 may be implemented as an I/O processor. For still other applications, the processor 510 may be a co-processor (used as an accelerator, as an example) or a stand-alone control plane processor. Depending on the configuration of blades and line cards, the distributed processing platform 500 may implement a switching device (e.g., switch or router), a server, a voice gateway or other type of equipment.

Figure 6:
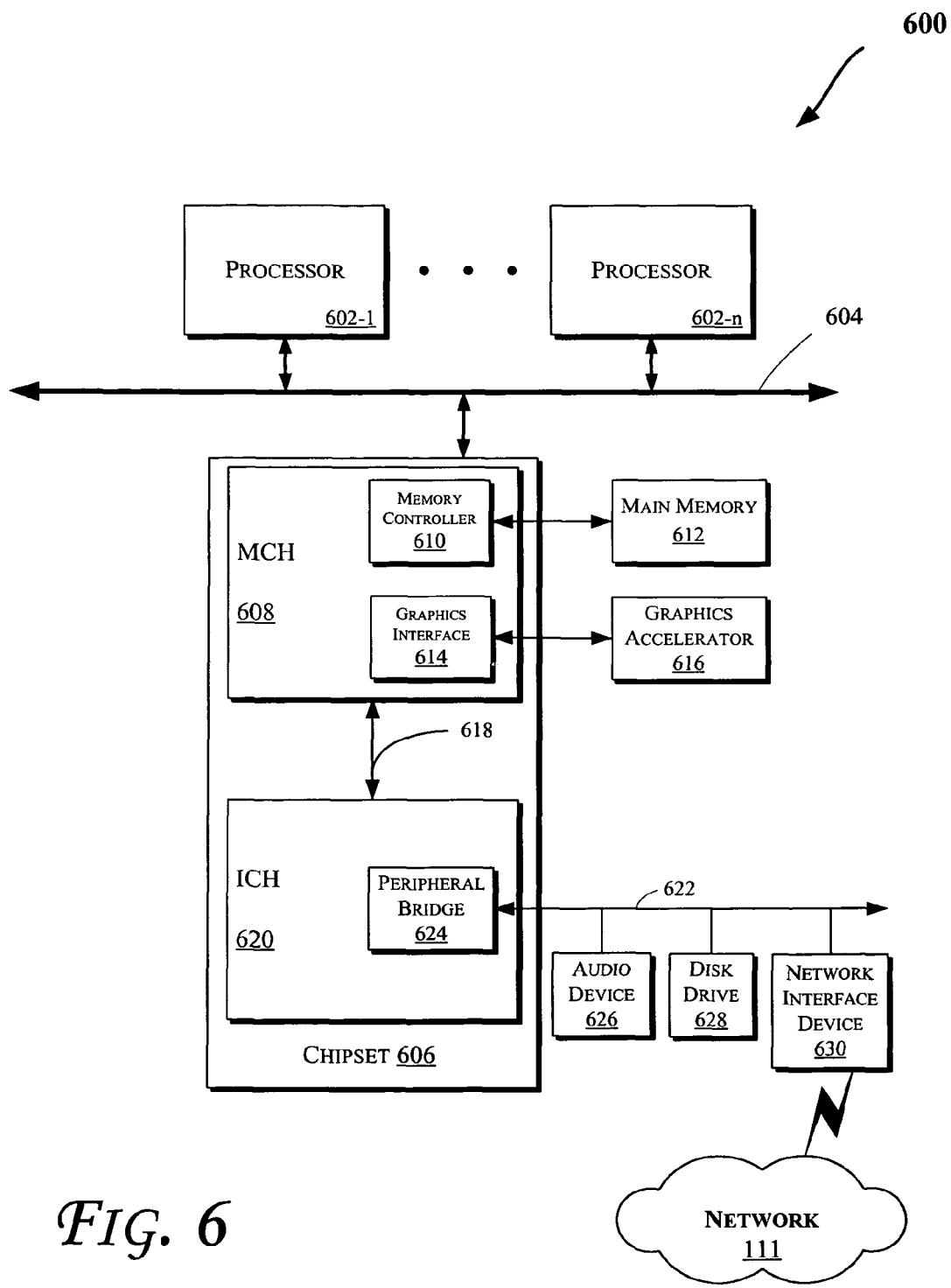
FIGS. 6 and 7 illustrate block diagrams of computing systems in accordance with various embodiments of the invention.

FIG. 6 illustrates a block diagram of a computing system 600 in accordance with an embodiment of the invention. The computing system 600 may include one or more central processing unit(s) (CPUs) 602 or processors coupled to an interconnection network (or bus) 604. The processors (602) may be any suitable processor such as a network processor (that processes data communicated over a computer network 111) or the like (including a reduced instruction set computer (RISC) processor or a complex instruction set computer (CISC)). Moreover, the processors (602) may have a single or multiple core design. The processors (602) with a multiple core design may integrate different types of processor cores on the same integrated circuit (IC) die. Also, the processors (602) with a multiple core design may be implemented as symmetrical or asymmetrical multiprocessors. In an embodiment, the processor cores 106, the frequency controller 102, and/or the processor 200 may be the same as or similar to the processors 602. Additionally, the operations discussed with reference to FIGS. 1-4 may be performed by one or more components of the system 600.

A chipset 606 may also be coupled to the interconnection network 604. The chipset 606 may include a memory control hub (MCH) 608. The MCH 608 may include a memory controller 610 that is coupled to a memory 612. The memory 612 may store data and sequences of instructions that are executed by the CPU 602, or any other device included in the computing system 600. In one embodiment of the invention, the memory 612 may include one or more volatile storage (or memory) devices such as random access memory (RAM), dynamic RAM (DRAM), synchronous DRAM (SDRAM), static RAM (SRAM), or the like. Nonvolatile memory may also be utilized such as a hard disk. Additional devices may be coupled to the interconnection network 604, such as multiple CPUs and/or multiple system memories.

The MCH 608 may also include a graphics interface 614 coupled to a graphics accelerator 616. In one embodiment of the invention, the graphics interface 614 may be coupled to the graphics accelerator 616 via an accelerated graphics port (AGP). In an embodiment of the invention, a display (such as a flat panel display) may be coupled to the graphics interface 614 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 618 may couple the MCH 608 to an input/output control hub (ICH) 620. The ICH 620 may provide an interface to I/O devices coupled to the computing system 600. The ICH 620 may be coupled to a bus 622 through a peripheral bridge (or controller) 624, such as a peripheral component interconnect (PCI) bridge, a universal serial bus (USB) controller, or the like. The bridge 624 may provide a data path between the CPU 602 and peripheral devices. Other types of topologies may be utilized. Also, multiple buses may be coupled to the ICH 620, e.g., through multiple bridges or controllers. Moreover, other peripherals coupled to the ICH 620 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or the like.

The bus 622 may be coupled to an audio device 626, one or more disk drive(s) 628, and a network interface device 630 (which is coupled to the computer network 111). Other devices may be coupled to the bus 622. Also, various components (such as the network interface device 630) may be coupled to the MCH 608 in some embodiments of the invention. In addition, the processor 602 and the MCH 608 may be combined to form a single chip. Furthermore, the graphics accelerator 616 may be included within the MCH 608 in other embodiments of the invention.

Additionally, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media suitable for storing electronic instructions and/or data.

Figure 7:
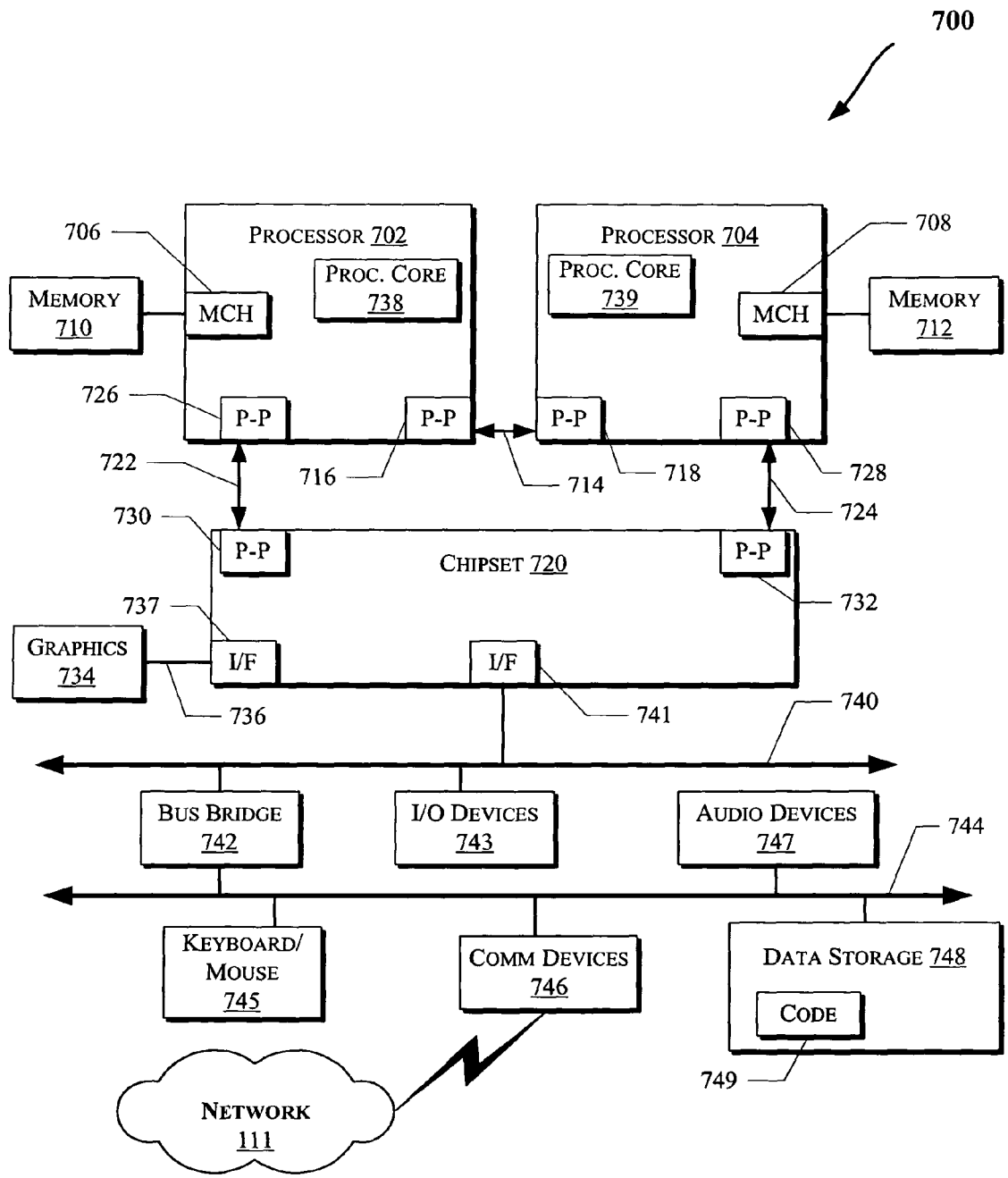

FIG. 7 illustrates a computing system 700 that is arranged in a point-to-point (PtP) configuration, according to an embodiment of the invention. In particular, FIG. 7 shows a system where processors, memory, and input/output devices are interconnected by a number of point-to-point interfaces. The operations discussed with reference to FIGS. 1-4 may be performed by one or more components of the system 700.

As illustrated in FIG. 7, the system 700 may include several processors, of which only two, processors 702 and 704 are shown for clarity. In an embodiment, the processor cores 106, the frequency controller 102, and/or the processor 200 may be the same as or similar to the processors 702 and 704. The processors 702 and 704 may each include a local memory controller hub (MCH) 706 and 708 to couple with memories 710 and 712. The memories 710 and/or 712 may store various data such as those discussed with reference to the memories 122 and/or 612.

The processors 702 and 704 may be any suitable processor such as those discussed with reference to the processors 602 of FIG. 6. The processors 702 and 704 may exchange data via a point-to-point (PtP) interface 714 using PtP interface circuits 716 and 718, respectively. The processors 702 and 704 may each exchange data with a chipset 720 via individual PtP interfaces 722 and 724 using point to point interface circuits 726, 728, 730, and 732. The chipset 720 may also exchange data with a high-performance graphics circuit 734 via a high-performance graphics interface 736, using a PtP interface circuit 737.

At least one embodiment of the invention may be located within the processors 702 and 704. For example, the frequency controller 102 and/or the processor cores 106 may be located within the processors 702 and 704 (e.g., as processor cores 738 and/or 739). Other embodiments of the invention, however, may exist in other circuits, logic units, or devices within the system 700 of FIG. 7. Furthermore, other embodiments of the invention may be distributed throughout several circuits, logic units, or devices illustrated in FIG. 7.

The chipset 720 may be coupled to a bus 740 using a PtP interface circuit 741. The bus 740 may have one or more devices coupled to it, such as a bus bridge 742 and I/O devices 743. Via a bus 744, the bus bridge 743 may be coupled to other devices such as a keyboard/mouse 745, communication devices 746 (such as modems, network interface devices, or the like that may be coupled to the computer network 111), audio I/O device, and/or a data storage device 748. The data storage device 748 may store code 749 that may be executed by the processors 702 and/or 704.

In various embodiments of the invention, the operations discussed herein, e.g., with reference to FIGS. 1-7, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include any suitable storage device such as those discussed with respect to FIGS. 6 and 7.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:
    a frequency controller to generate one or more clock enable signals responsive to one or more feedback signals;
    a plurality of processor cores coupled to the frequency controller to each receive one of the clock enable signals and a system clock signal; and
    logic to combine the system clock signal and one of the clock enable signals to generate a frequency controlled clock signal, the frequency controlled clock signal to at least partially clock one or more internal components of one of the processor cores, wherein the system clock signal is to clock any remaining internal components of the one processor core other than the one or more internal components of the one processor core which are at least partially clocked by the frequency controlled clock signal.

2. The apparatus of claim 1, wherein the plurality of processor cores comprise one or more peripheral components that are at least partially clocked by the system clock signal.

3. The apparatus of claim 2, wherein the one or more peripheral components comprise one or more data and address registers, an incoming data buffer, an outgoing data buffer, or a command bus state machine and buffer.

4. The apparatus of claim 1, wherein the internal components are one or more of an incoming data buffer, an arithmetic logic unit (ALU) and data path unit, a control unit, a control store, or an outgoing data buffer.

5. The apparatus of claim 1, wherein the frequency controller comprises logic to generate the one or more feedback signals.

6. The apparatus of claim 1, further comprising one or more temperature sensors in proximity to one or more components of the apparatus.

7. The apparatus of claim 1, further comprising a processor that comprises the frequency controller.

8. The apparatus of claim 1, wherein the plurality of processor cores and the frequency controller are on a same integrated circuit die.

9. The apparatus of claim 1, wherein the plurality of processor cores process data communicated over a computer network.

10. The apparatus of claim 1, wherein the processor cores are processor cores of a symmetrical multiprocessor or an asymmetrical multiprocessor.

11. The apparatus of claim 1, wherein the logic comprises at least one AND gate.

12. A method comprising:
generating one or more clock enable signals responsive to one or more feedback signals;
receiving one of the clock enable signals and a system clock signal by each of a plurality of processor cores;
combining the system clock signal and one of the clock enable signals to generate a frequency controlled clock signal; and
clocking one or more internal components of one of the processor cores at least partially with the frequency controlled clock signal, wherein the system clock signal is to clock any remaining internal components of the one processor core other than the one or more internal components of the one processor core which are at least partially clocked by the frequency controlled clock signal.

13. The method of claim 12, further comprising assigning a priority to each of the plurality of processor cores.

14. The method of claim 13, further comprising adjusting a frequency of the frequency controlled clock signal based on the assigned priority.

15. The method of claim 12, further comprising generating the one or more feedback signals responsive to one or more of a traffic congestion, quality of service criterion, data priority, or temperature.

16. The method of claim 12, further comprising reducing a frequency of the frequency controlled clock signal when one of the feedback signals indicates a rise in temperature proximate to one or more of the processor cores.

17. The method of claim 12, further comprising increasing a frequency of the frequency controlled clock signal when one of the feedback signals indicates a reduction in temperature proximate to one or more of the processor cores.

18. A computer-readable medium comprising instructions that when executed on a processor configure the processor to perform operations comprising:
generating one or more clock enable signals responsive to one or more feedback signals;
receiving a system clock signal and one of the clock enable signals by each of a plurality of processor cores;
combining the system clock signal and one of the clock enable signals to generate a frequency controlled clock signal; and
clocking one or more internal components of one of the processor cores at least partially with the frequency controlled clock signal, wherein the system clock signal is to clock any remaining internal components of the one processor core other than the one or more internal components of the one processor core which are at least partially clocked by the frequency controlled clock signal.

19. The computer-readable medium of claim 18, wherein the operations further comprise generating the one or more feedback signals responsive to one or more of a traffic congestion, quality of service criterion, data priority, or temperature.

20. A traffic management device comprising:
a switch fabric; and
an apparatus to process data communicated via the switch fabric comprising:
a frequency controller to generate one or more clock enable signals responsive to one or more feedback signals;
a plurality of processor cores coupled to the frequency controller to each receive one of the clock enable signals and a system clock signal; and
logic to combine the system clock signal and one of the clock enable signals to generate a frequency controlled clock signal, the frequency controlled clock signal to at least partially clock one or more internal components of one of the processor cores, wherein the system clock signal is to clock any remaining internal components of the one processor core other than the one or more internal components of the one processor core which are at least partially clocked by the frequency controlled clock signal.

21. The traffic management device of claim 20, wherein the switch fabric conforms to one or more of common switch interface (CSIX), advanced switching interconnect (ASI), HyperTransport, Infiniband, peripheral component interconnect (PCI), Ethernet, Packet-Over-SONET (synchronous optical network), or Universal Test and Operations PHY (physical) Interface for ATM (UTOPIA).

* * * * *